(12) United States Patent
Handa et al.

(10) Patent No.: US 6,434,336 B2
(45) Date of Patent: Aug. 13, 2002

(54) DATA-IMPRINTING APPARATUS FOR A LENS-EQUIPPED FILM UNIT

(75) Inventors: Masaaki Handa; Shinsuke Ito, both of Suwa; Hisashi Tasaka; Yukitsugu Hata, both of Minamiashigara, all of (JP)

(73) Assignees: Seiko Epson Corporation, Tokyo; Fuji Photo Film Co., Ltd., Kanagawa, both of (JP)

( * ) Notice: Subject to any disclaimer, the term of this patent is extended or adjusted under 35 U.S.C. 154(b) by 0 days.

(21) Appl. No.: 09/779,418

(22) Filed: Feb. 7, 2001

Related U.S. Application Data

(62) Division of application No. 08/845,586, filed on Apr. 25, 1997, now abandoned.

(30) Foreign Application Priority Data

Apr. 25, 1996 (JP) .............................................. 8-105314
Feb. 27, 1997 (JP) .............................................. 9-044375

(51) Int. Cl.⁷ .............................. G03B 7/26; G03B 17/24
(52) U.S. Cl. ........................ 396/277; 396/300; 396/318
(58) Field of Search ............................. 396/6, 310–321, 396/300, 277, 287, 292

(56) References Cited

U.S. PATENT DOCUMENTS 5,715,486 A * 2/1998 Kim et al. ................... 396/299
5,937,207 A * 8/1999 Ito et al. ......................... 396/6

FOREIGN PATENT DOCUMENTS

JP        5-289164        11/1993
JP        8-114841        5/1996

* cited by examiner

Primary Examiner—David M. Gray

(57) ABSTRACT

A data-imprinting apparatus for preventing the imprinting of incorrect dates in a lens-equipped film unit that lacks a monitor display unit for the confirmation of the date display. The lens-equipped film unit 1 contains a built-in data module 27 that lacks an external display unit that allows the confirmation of the date display from the outside. The data module 27 contains a transmission-type liquid crystal display unit 45 that automatically updates and displays dates based upon a pre-stored calendar. In the liquid crystal display unit 45, external light enters from the light collection window 15 on the front cover 12, thus creating a beam of data light. The data light, acting in concert with the shutter release operation, is guided into a dark box. The image-forming optical system that is provided in the dark box forms an image of the data light on a part of the photographic film. When a temporary disruption of the power supply from the battery 70 occurs due to vibrations, for example, the power supply monitoring circuit 75 that is incorporated in the data module 27 detects the event, transmits the off-mode signal to the LCD driver 73, and causes the display on the liquid crystal display unit 45 to enter into a non-display state.

45 Claims, 9 Drawing Sheets

DATA-IMPRINTING APPARATUS FOR A LENS-EQUIPPED FILM UNIT

CONTINUING APPLICATION DATA

This application is a divisional of Ser. No. 08/845,586, filed Apr. 25, 1997, now abandoned the contents of which are incorporated herein by reference.

BACKGROUND OF THE INVENTION

1. Field of the Invention

This invention relates to a data-imprinting apparatus that is incorporated into a lens-equipped film unit in order to imprint light representative of the date, for example, onto the exposure screen of the photographic film. The light representative of the data is created by using either external light or an imprinting light source.

2. Description of the Related Art

Lens-equipped film units built into a unit body with a built-in shooting mechanism are known. These film units afford ease of photographing at any time. Among the lens-equipped film units, one with a data-imprinting mechanism is proposed in the OFFICIAL GAZETTE FOR PATENT APPLICATIONS H5-289164 (1993). The data-imprinting mechanism described in the GAZETTE functions as follows: when shooting is complete, by setting a desired date using a dial-type manual data-operating unit that is provided on the back of the body, a data-imprinting shutter component is actuated in interlock with the photographing shutter vane. This directs the natural light entering from the window at the front of the body to the backside of the cover through the lightguide, so that the date is imprinted on a contact basis onto the exposure screen from the backside of the photographic film through a data-imprinting plate on which a reverse-image (transparent) date is displayed.

The lens-equipped film unit described in the GAZETTE requires the manual actuation of the data-imprinting operation unit for each photographing date, which can be cumbersome. Therefore, it is desirable to incorporate a data-imprinting mechanism wherein a clock circuit with a pre-stored calendar is provided in the lens-equipped film unit so that the display can be updated automatically.

Data-imprinting devices that are used in most cameras (as distinct from lens-equipped film units) contain external display units that allow the user to check the date to be imprinted, and external operation units that allow the user to change the displayed date. Should the time data (date) in the clock circuit return to the initial value in the calendar or display an unreliable or a totally invalid date due to a temporary shutoff of the electrical supply to the clock circuit, due to vibrations or a battery replacement, for example, one can manipulate the external operation unit by looking at the external display and change the display status of the clock circuit to the correct date.

In contrast, lens-equipped film units, after being used, are sent to a developing shop together with the exposed photographic film. After the exposed photographic film has been removed, the film units are returned to the manufacturing plant for recycling. Because they are used only for a limited period of time as compared with an ordinary camera, and because they are low-priced, from a cost-reduction standpoint any data-imprinting apparatus used in such a lens-equipped film unit does not contain any external display units or operation units.

However, if external display units for monitoring or external operation units for correcting the time-keeping action of the clock circuit are omitted from a built-in data-imprinting device in a lens-equipped film unit, any fault that occurs in the data-imprinting device goes undetected with the result that the incorrect date is directly imprinted onto the photographic film.

Causes of a fault occurring in a data-imprinting device include: the lens-equipped film unit being subject to vibrations, as noted previously, resulting in a temporary interruption of the electrical supply to the built-in clock circuit in the data-imprinting device; external noise such as static electricity; and the intrusion into the clock circuit of strobe-recharging or flashing noise that is generated from the strobe circuit board that is incorporated into the film unit. In all cases, these problems lead to the resetting of the clock circuit, reverting the time data to the initial data, or cause a malfunction of the clock circuit resulting in an incorrect date display.

OBJECTS OF THE INVENTION

An object of the present invention is to prevent the imprinting of incorrect dates in a data-imprinting device that does not contain external display units for monitoring or external operation units.

SUMMARY OF THE INVENTION

To solve the above problems in a data-imprinting apparatus for a lens-equipped film unit that is provided with a clock circuit that keeps time by receiving electricity from a battery incorporated in a lens-equipped film unit containing photographic film, and a liquid crystal display element that displays date characters based upon the time data supplied from the clock circuit, such that the apparatus imprints the date characters displayed on said liquid crystal display element by means of external light that enters the film unit in conjunction with a shutter release operation, the present invention adopts the following structure: a data-imprinting apparatus for a lens-equipped film unit comprising: a detection means that detects any temporary interruption of the electrical supply from the battery to the clock circuit after the clock circuit has started keeping time; and a data-disabling means that, if a temporary interruption of the electrical supply is detected by the detection means, the liquid crystal display element is maintained in a non-displaying state so that no date characters will be imprinted onto the photographic film.

Among the data-imprinting devices that are known is one which is equipped with an imprinting light source that lights in conjunction with a shutter releasing operation, instead of the use of external light which falls incident upon and in conjunction with a shutter-releasing operation. The date characters displayed on the liquid crystal display element are imprinted onto the photographic film through the use of the light from the light source. In the case of a data-imprinting device of this configuration, the data-disabling means of the present invention disables the light source from lighting when a temporary interruption of the electrical supply is detected instead of maintaining the liquid crystal display element in a non-display state.

In the data-imprinting device of this configuration in the present invention, the lens-equipped film unit into which the device is incorporated has a limited useful life. Further, it suffices to simply imprint the date onto the photographic film. Therefore, the operation unit for modifying a date display can be provided inside the lens-equipped film unit such that the activation of the operation unit can be commenced when the device is shipped from the factory, so that the time-keeping operation of the clock circuit is started. Subsequently, and until such time as it is returned to the factory, i.e., during its period of use, if there is a temporary interruption of the electrical supply from the battery contained in the lens-equipped film unit to the clock circuit, the event is detected by the detection means. As a result, the data-disabling means holds the liquid crystal display element in a non-display state. Consequently, the present invention can prevent the imprinting of any incorrect date display. In devices that are equipped with an imprinting light source the imprinting light source is disabled from lighting, which also prevents the imprinting of any incorrect date display.

The data-imprinting device of the present invention comprises, in addition to the aforementioned detection means, or in place of the detection means, an initial data retention means that retains the initial data for the clock circuit, and a comparison means that compares time data from the clock circuit with the initial data such that if the comparison means determines that the data is in agreement with the initial data then the data-disabling means ensures that no date characters are imprinted onto the photographic film.

According to this configuration, if the clock circuit is accidentally reset due to a temporary interruption of the electrical supply to the clock circuit or if the clock circuit is reset by the intrusion of external noise such as static electricity or due to an internal noise that is generated when the strobe is recharged or when a flash is actuated, such resetting actions can be detected. Consequently, the present invention can prevent the imprinting of any attendant improper date display onto the photographic film.

As described above, the data-imprinting apparatus of the present invention, upon detecting that an interruption of the power supply to the clock circuit has occurred, holds the liquid crystal display element in a non-display state. In a configuration in which an imprinting lamp is provided, any subsequent lighting of the imprinting light is disabled. Therefore, the present invention can prevent the imprinting onto the photographic film of the clock contents of a faulty clock circuit that is caused by a temporary disruption of power supply.

Furthermore, the data-imprinting apparatus of the present invention, upon detecting that the clock circuit has been reset and its clock contents have been initialized, holds the liquid crystal display element in a non-display state. In a configuration in which an imprinting lamp is provided, any subsequent lighting of the imprinting light is disabled. Therefore, the present invention can prevent the imprinting onto the photographic film of the clock contents of a clock circuit that has been reset because of an external noise, for example.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The following is a description of the lens-equipped film unit with a built-in data-imprinting device of the present invention with reference to drawings.

Figure 1:
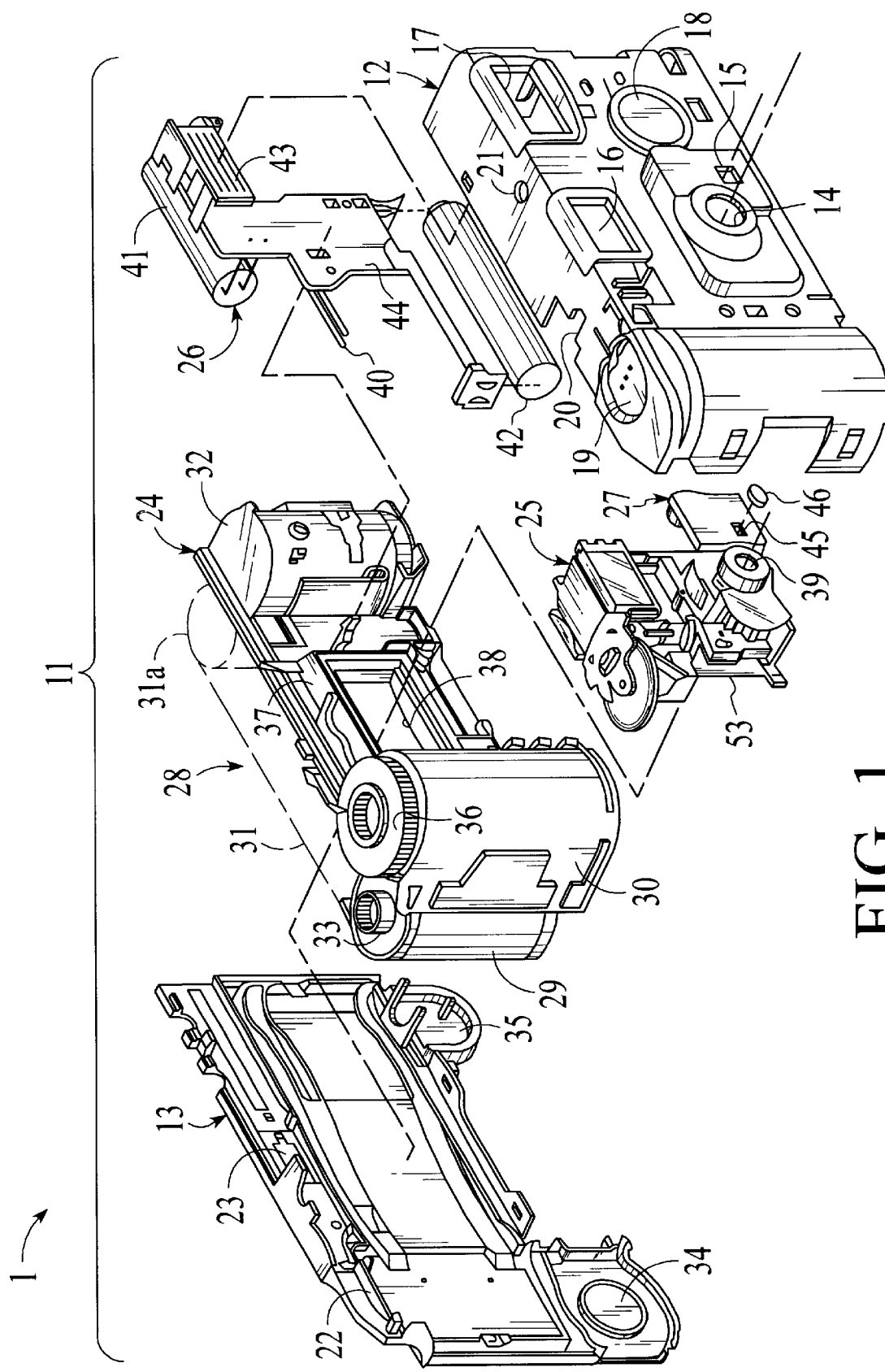
FIG. 1 is an exploded perspective view of the lens-equipped film unit of the present invention.

FIG. 1 is an exploded perspective view of a lens-equipped film unit (hereinafter "film unit"). As indicated in FIG. 1, the film unit 1 comprises a unit body 11 and an external case (not shown in the figure) that covers the exterior of the unit body. The unit body 11 is equipped with a front cover 12 and a back cover 13. The following components are formed on the front side of the front cover 12: a shooting window 14, a light collection window 15 that admits natural light, an object finder window 16, a strobe-flash window 17, and a strobe recharge start button 18. On the top of the front cover 12 is a shutter button 19, a frame count display window 20, and a charge completion display window 21. On the rear of the back cover 13 is a film winder knob display window 22, and a finder eyepiece window 23. The exterior case (not shown in the figure) that covers the unit body 11 contains openings that expose these components to the outside.

In addition to the front cover 12 and the back cover 13, the unit body 11 is equipped with a body base 24, an exposure unit 25, a strobe unit 26, a data module 27, which is a data-imprinting device, and a photographic film cartridge 28.

Formed integrally on the body base 24 is a cartridge storage chamber 30 that stores the exposed film cartridge 29, and a film roll chamber 32 that stores any unexposed photographic film 31 as a film roll 31a. Although in this embodiment only a film roll 31a is stored, a film roll wound on a core may also be stored. The back end of the photographic film 31 is hooked to the spool 33. The photographic film 31 is of a type with a predetermined film sensitivity. It should be noted that for the photographic film cartridge 28, a type of film can be used in which, when the film is not being used, the film lead is stored inside the cartridge and the rotation of the spool advances the photographic film to the outside of the cartridge.

The back cover 13 is mounted on the back of the body base 24 in a detachable manner. The back cover and the body base 24 together hold the photographic film cartridge 28 in a sealed manner that prevents any light penetration. The bottoms of the cartridge storage chamber 30 and the film roll chamber 32 have openings. After the photographic film cartridge 28 is loaded, these openings are closed by the pull-top bottom covers 34 and 35 that are provided on the back cover 13. The bottom cover 34 opens to remove the cartridge 29 containing the exposed photographic film.

On the top of the cartridge storage chamber 30 is a winder knob 36 that moves in a freely rotating manner. A fork is formed integrally with the lower portion of the winder knob 36. The fork passes through the topside opening of the cartridge storage chamber 30 and hooks to the spool 33. A part of the winder knob 36 is exposed through the opening 22 of the back cover 13. The film-winding operation that rotates the exposed part in the film-winding direction (the counterclockwise direction shown in the figure) causes the spool 33 to rotate in the film take-up direction. In this way, the exposed photographic film 31 is stored inside the cartridge 29.

A partitioned dark box 37 that forms a part of a dark box is integrally formed between the cartridge storage chamber 30 and the film roll chamber 32. An exposure opening 38 is formed on the back of the partitioned dark box 37. An exposure unit 25 is mounted in a detachable manner on the side of the partitioned dark box 37. A shooting lens 39, a shutter mechanism, and a partitioned dark box 53 are provided, from the front to the back, on the exposure unit 25. The shooting lens 39 is placed in the position that corresponds to the shooting window 14. The partitioned dark box 53 for the exposure unit 25, together with the partitioned dark box 37 for the body base 24, forms a black box. The formation of the black box forms the photographing light path between the shooting lens 39 and the exposure opening 38 as a darkroom. Although the black box is formed on a partitioned basis, it may be formed on either the body base 24 or the exposure unit 25 as an integral unit.

A film detente mechanism, a shutter charge mechanism, and a finder optical system are incorporated onto the top of the partitioned dark box as the exposure unit 25. These components are implemented as a single unit. A data module 27 is mounted in a detachable manner on the front right side of the exposure unit 25. A condenser lens 46, held between the liquid crystal display unit and the inner wall of the front cover 12, is provided on the front side of the liquid crystal display unit 45 onto which the data module 27 imprints data (e.g. the date). The condenser lens 46 condenses the natural light entering through the light collection window 15 onto the liquid crystal display unit 45.

The strobe unit 26 is held in the space between the front cover 12 and the film roll chamber 32; it is composed of a synchronization switch 40, a main capacitor 41, a battery 42, a strobe flash unit 43, and a strobe circuit board 44, among other components. When the strobe recharge start button 18 is pushed, the voltage delivered from the battery 42 rises, which effects the recharging of the main capacitor 41. In conjunction with the action of the shutter mechanism, the synchronization switch 40 turns on, and strobe light is emitted from the strobe flash unit 43. The strobe light is irradiated upon the subject through the strobe-flash window 17.

Figure 2:
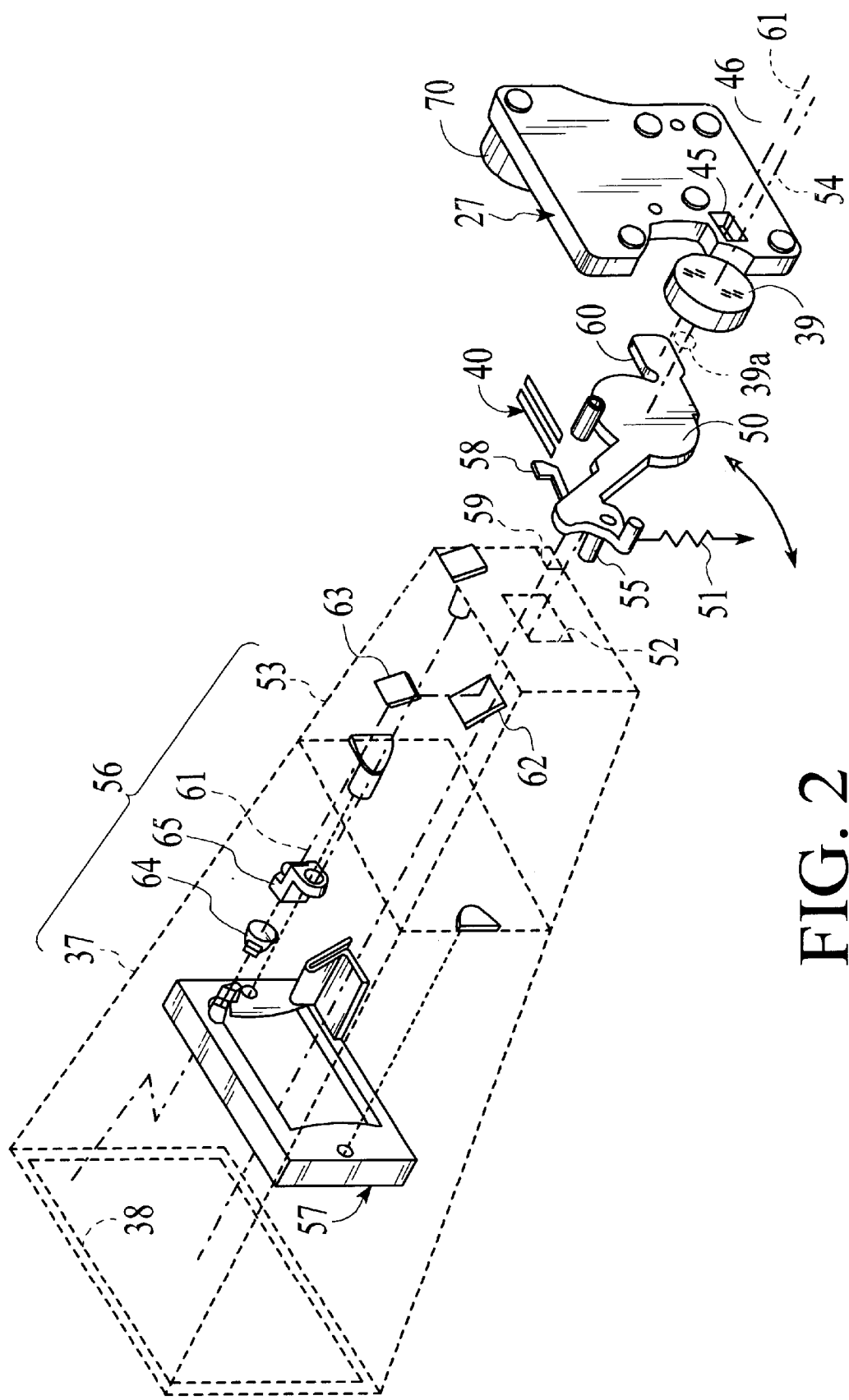
FIG. 2 is an exploded perspective view of the principal components of the data optical system for the film unit shown in FIG. 1.
Figure 3:
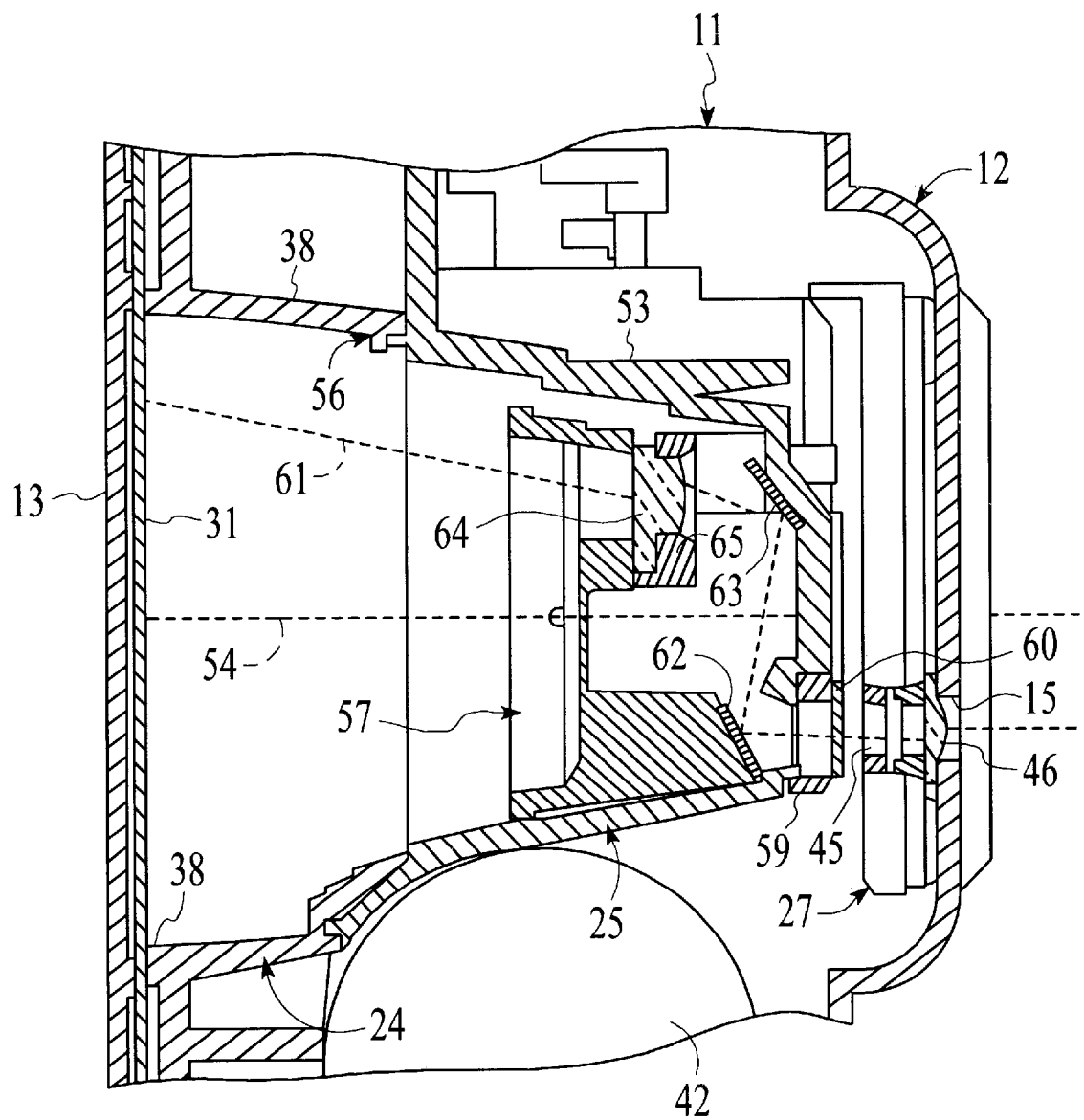
FIG. 3 is a cross-sectional view of the principal components of the data optical system for the film unit shown in FIG. 1.

FIG. 2 is an exploded perspective view of the principal components of the data optical system of the film unit 1. FIG. 3 is a cross-sectional view of the data optical system. As shown in these figures, a fixed stop 39a is supported on the back of the shooting lens 39 that is mounted on the exposure unit 25. A shutter vane 50 is supported in a freely rotating manner on the back of the fixed stop 39a. The shutter vane 50 is energized by the retracting spring 51 toward the closing position at which the shutter opening 52 is closed. The shutter opening 52 is provided at the front center of the partitioned dark box 53 for the exposure unit 25, i.e., on the shooting optical axis 54 that passes through the shooting lens 39.

In conjunction with the pressing of the shutter button 19, the top edge of the shutter vane 50 is kicked by a kicking lever in the shutter mechanism and makes one round trip centered on the axis 55, thus opening and closing the shutter opening 52. During this operation, the subject light which has entered the shutter opening 52, enters into the dark box 56 composed of two partitioned dark boxes 37 and 53, and, passing through the harmful-light-shielding frame 57, falls incident upon the photographic film 31 that is set in the exposure opening 38. When the shutter vane 50 is moved, the protrusion 58 located at the top edge of the shutter vane 50 switches on the synchronization switch 40.

Concurrently, data light passes through the liquid crystal display unit 45 and through the data light shutter opening 59 formed on the front side of the dark box 56, instead of passing through the shooting lens 39, and is guided to the interior of the dark box 56. The data light shutter opening 59 is located separately at a position to the lower right of the shutter opening 52 when viewed from the front. The data light shutter opening is opened and closed by the shutter material 60, at the tip of the shutter vane 50, in concert with the opening/closing action of the shutter vane 50.

The data light, guided into the dark box 56, is directed to the exposure opening 38 along the optical axis 61 of the image-forming optical system, and forms an image on the photographic film 31 that is set there, from the front side, i.e., from the emulsion surface side. The image-forming optical system is composed of two mirror plates 62 and 63, and an image lens 64. These components are held by the front side of the harmful-light-shielding frame 57 and the front inner wall of the partitioned dark box 53. The harmful-light-shielding frame 57 is attached to the back of the partitioned dark box 53. The image lens 64 is secured at an exact position by a holder material 65.

As shown in FIG. 3, the data light, which has passed through the liquid crystal display unit 45 of the data module 27, is reflected by the mirror plate 62 higher than the shooting optical axis 54; it is also reflected by the other mirror plate 63 toward the exposure opening 38, and enters the image lens 64. The image lens 64 causes the data light to form an image in the upper right position of the exposure opening 38 when viewed from the shooting lens 39. Thus, since the data light is imprinted in the upper right position of the exposure opening 38, not only during horizontal-position shooting, but also during vertical-position shooting, a data image (e.g. the date) is accurately imprinted on the lower portion of the subject image. Therefore, no possibility exists that the data image will be recorded onto the face, for example, of the subject on an overlapping basis.

It should be noted that, for the purposes of this text, the "vertical-position shooting" refers to the shooting which one performs by holding the film unit in a vertical orientation so that the shutter button 19 is in the lower right position. For the image-forming optical system, a Z-shaped light guide may be employed in place of the two mirror plates 62 and 63. In this case, the data light entering the light guide is totally reflected within the light guide; therefore, it never leaks out of the light guide so that no extraneous light enters the photographing light flux.

Figure 4:
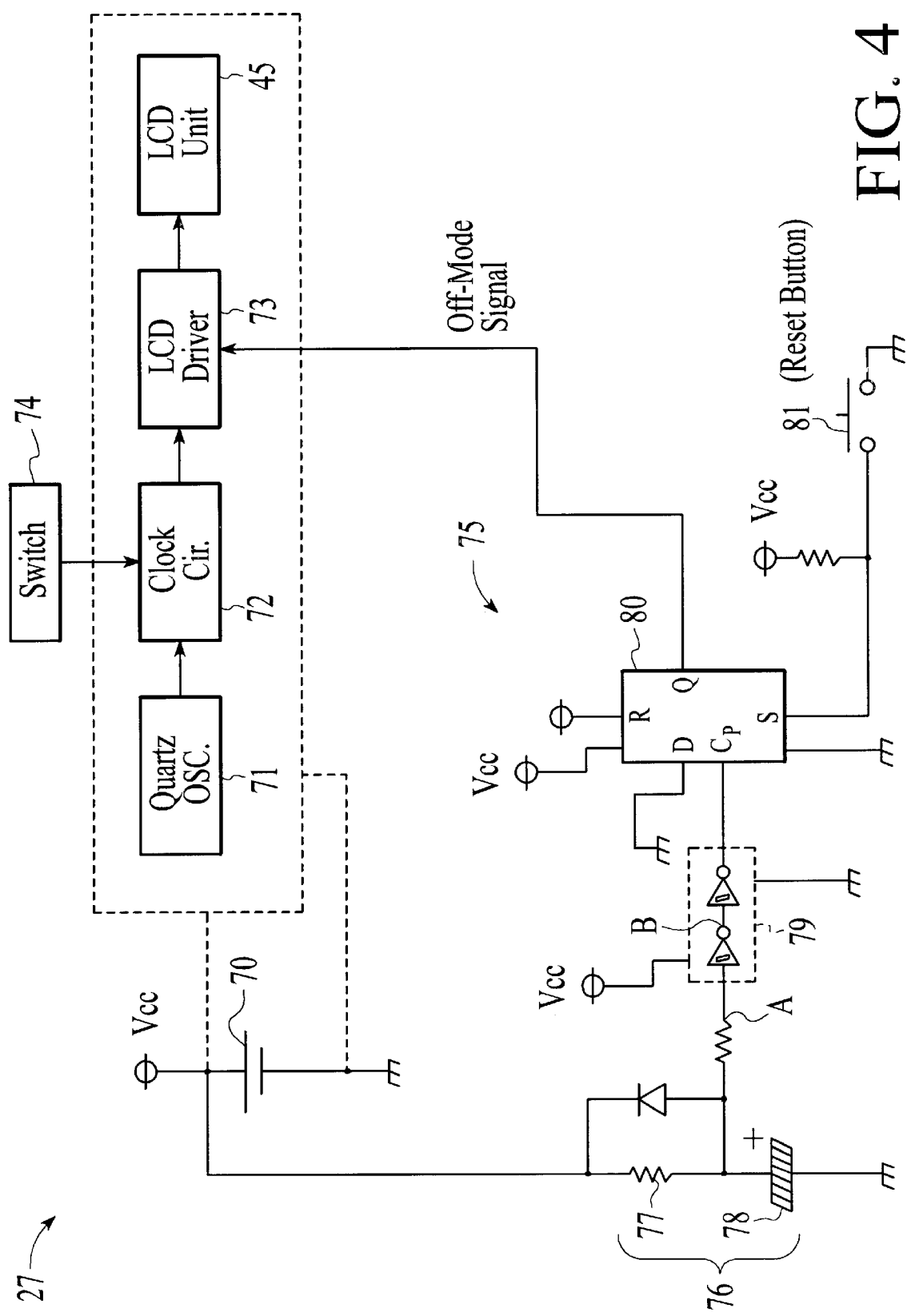
FIG. 4 is a schematic block diagram showing the control circuit for the data module incorporated into the film unit of FIG. 1.

FIG. 4 shows a schematic circuit block diagram a first embodiment of the data module 27 of the present invention. With reference to FIG. 4, the data module 27 is a single-unit entity composed of a battery 70, a quartz oscillator 71, a clock circuit 72, an LCD driver 73, a liquid crystal display unit 45 that generates transparent characters, a switch 74 that initializes the data, and a power supply monitoring circuit 75, among other components. Data module 27 is preferably an auto-date mechanism that automatically updates the date characters displayed on the liquid crystal display unit 45. The battery 70 is detachable.

The clock circuit 72 holds several future years of calendar information in memory. The clock circuit 72 corrects a built-in reference pulse generated by means of quartz oscillator 71, and transmits accurate time pulses to an LCD driver 73. The LCD driver 73 performs control functions based upon the clock data obtained from the clock circuit 72 so that data characters are displayed on the liquid crystal display unit 45. Because the data initialization switch 74 is normally covered by external covers 12 and 13, it cannot be manipulated unless the data module 27 is removed. The data initialization switch is used at the factory so that date display can be corrected on the day the device is manufactured.

The liquid crystal display unit 45 is positioned in alignment with the light collection window 15 of cover 12. On the liquid crystal display unit 45, characters such as "96 5 10" are displayed in reverse. The year, the month, and the day are composed of two characters each, and each character is displayed in seven segments. Since the second digit from the right of the characters that represent the month can be only "1", a two-segment display, in which segments are placed vertically in a straight line, may also be employed.

The power supply monitoring circuit 75 is composed of a detection means and a data-disabling means. The battery 70 for the auto-date mechanism is also used to supply power for the power supply monitoring circuit 75.

The detection means comprises a CR circuit 76 and a waveform-reshaping circuit, among other components. If the supply of power from the battery 70 to the clock circuit 72 is temporarily interrupted after the clock circuit 72 has begun keeping time and the supply of power is subsequently resumed, the detection means detects such events. When the supply of power is temporarily suspended, the CR circuit 76 generates one pulse waveform. The pulse width of the pulse waveform is generated on a delayed basis according to a time constant that is generated by the C (capacitor) 78 and the R (resistor) 77. The time constant is predetermined so that a rise (a rise signal) is generated within a certain length of time after the supply of power is resumed. For the waveform-reshaping circuit, a Schmitt trigger inverter IC 79 having multiple input pins is used. The pulse waveform is input serially into two Schmitt trigger inverter input pins in the Schmitt trigger inverter IC 79. A pulse waveform that is immune to the effects of noise is reshaped, and this creates an up-edge that accurately indicates the resumption of the power supply.

The data-disabling means comprises a latching means that responds to the detection signal from the detection means, i.e., the up-edge that is generated within a specified length of time after the resumption of the power supply and sends the off-mode signal to LCD driver 73. Upon receiving the off-mode signal, the LCD driver 73 performs a control that places the liquid crystal display unit 45 in a non-display state in which characters are disabled, i.e., all segments are turned off.

The latching means consists of a flip-flop IC 80. The flip-flop IC 80 is a D-FF IC. The D-FF IC contains input pins S (set) and R (reset). The H-level signal is always applied to the R pin, and the L-level signal is always applied to the data input D pin. Normally the H-level signal is applied to the S pin. When the reset button 81 is pressed, the signal changes to the L level. When the reset button 81 is released, a signal which has changed to the H level is re-input.

Like the switch 74, the reset button 81 cannot be manipulated from outside of the film unit; it can only be manipulated from outside of the date module 27. The reset button is operated at the factory after the battery 70 is initially mounted or when the liquid crystal display unit 45 is to be reset after its display has been disabled. When the H-level signal is input simultaneously to both the S and R pins, this operation changes the signal that is transmitted from the Q output to the LCD river 73 into the H level. When the Q output is an H-level signal, the LCD driver 73 enables the display on the liquid crystal display unit 45 to occur.

The instantaneous stoppage pulse signal is input into a CP pin that determines the memory storage timing. At the instant an up-edge (a rise signal) occurs from an "L" to an "H" of the CP input, the Q output always maintains in its memory the state of the D input at that instant until the next up-edge for the CP input is entered. In this case, the D input is treated as the L level and the Q output is treated as an H-level signal after power supply is resumed following an instantaneous power interruption and the reset button 81 is pressed. Therefore, if an up-edge is subsequently entered as a CP input, the Q output changes into an L-level signal. The change of the Q output into the L level causes the LCD driver 73 to disable the display on the liquid crystal display unit 45.

The following describes how the film unit 1 as configured above operates. At the factory, initially, workers mount the battery 70 on the data module 27, and press the reset button 81. This changes the Q output from the D-FF IC 80 into the H level, and allows the LCD driver 73 to enable the liquid crystal display unit 45 to display information. Subsequently, workers manipulate the switch 74 to change the display on the liquid crystal display unit 45 to the date of manufacture. The resulting data module 27 is incorporated into the film unit 1 and shipped.

The user of the camera operates the winder knob 36 to wind the photographic film 31. When the photographic film 31 advances in the direction of winding, in conformance with that action, the sprocket that comprises the film-winding stopping mechanism rotates. When the sprocket has turned a prescribed amount, the film-winding stopping mechanism locks both the rotation of the sprocket and that of the winder knob 36. This causes the photographic film 31 to wind by one frame with the result that the first shooting frame is set at the exposure opening 38.

When the shutter button 19 is pressed the shutter vane 50 is kicked by a kicking lever. The shutter vane 50 thus kicked makes one round trip centered upon the axis 55. Because shutter material 60 for admitting data light is integrated with the shutter vane 50, the motion of the shutter vane opens and closes the two shutter openings 52 and 59. During the opening and closing motions, the subject light from the shutter opening 52, passing through the shooting window 14 and the shooting lens 39, enters into the interior of the dark box 56; concurrently, the data light, admitted by the other shutter opening 59 and passing through the light collection window 15, the condenser lens 46, and the liquid crystal display unit 45, enters into the interior of the same dark box.

The subject light, after passing through the harmful-light-shielding frame 57 inside the dark box 56, falls incident upon the photographic film 31 that is set in the exposure opening 38. The data light falls upon the image lens 64 through the mirror plates 62 and 63. The image lens 64 forms an image in the upper right portion of the photographic film 31 that is set in the exposure opening 38. This image is exposed with the subject light. Because the condenser lens 46 is provided in front of the liquid crystal display unit 45, the data light undergoes an increase in the data light dose before reaching the film surface, thus resulting in a clear image formation. Furthermore, the presence of the image lens 64 also permits the clear imprinting of the outline of the data image.

For strobe photography, one depresses the strobe recharge start button 18 before pressing the shutter button 19. This causes an increase in the voltage from the battery 42 and begins the charging process for the main capacitor 41. When the main capacitor 41 has been charged, a lamp indicating the completion of the charging process is displayed in the window 21. When one depresses the shutter button 19 after confirming this display, as the synchronization switch 40 turns on during the motion of the shutter vane 50, the strobe light from the strobe flash unit 43 is irradiated toward the subject. After being reflected by the subject, the strobe light is guided into the dark box 56 from the shutter opening 52 through the shooting lens 39, and falls incident upon the photographic film 31 that is set in the exposure opening 38. Concurrently, the strobe light reflected by the subject also enters the light collection window 15, thus generating data light rays. As stated previously, the data light is exposed on the photographic film 31. In this manner, even if the external light is strobe light, the data image (e.g. the date) can accurately be imprinted.

By repeating the above-described shooting actions, one can ensure that data images are imprinted along with subject images onto the photographic frames.

Figure 5:
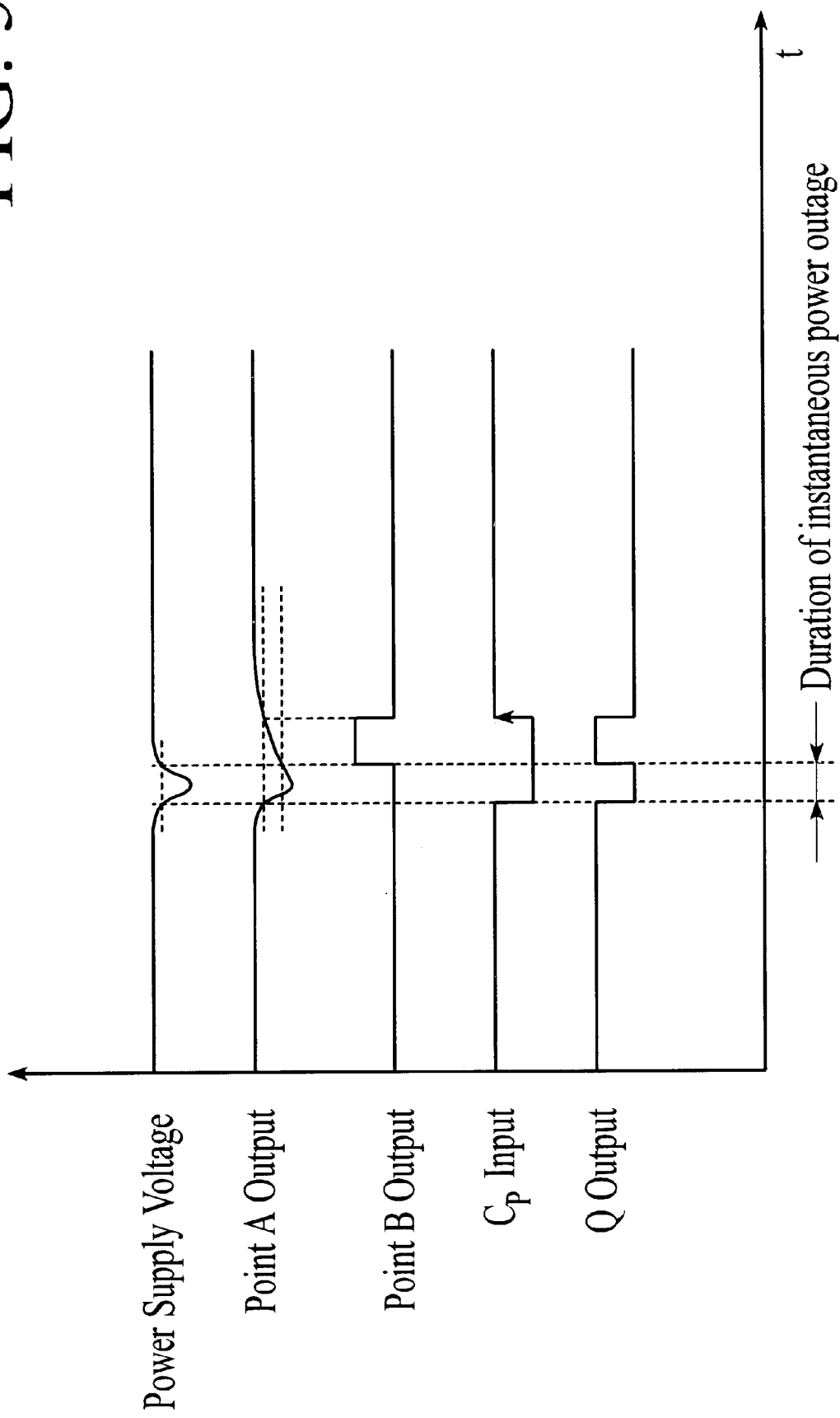
FIG. 5 is a timing chart showing the operation of the components of the control circuit of FIG. 4.

The following describes, with reference to the timing chart in FIG. 5, the action that occurs when the battery 70 is temporarily disconnected from the data module 27 and the electrical supply from the battery 70 to the data module 27 is temporarily interrupted.

With reference to FIGS. 4 and 5 if the battery 70 is temporarily disconnected from the data module 27 and the electrical supply from the battery 70 to the data module 27 is temporarily interrupted due to vibrations, for example, that are exerted from the outside of the lens-equipped film unit, the CR circuit 76 generates one pulse waveform, and this produces the output waveform shown as point A output in FIG. 5. The rise of the pulse waveform is generated by the time constants C78 and R77 after a specified length of time following the resumption of the power supply. The pulse signal is input into one Schmitt trigger inverter in the Schmitt trigger inverter IC 79, where it is reshaped into the point B output waveform shown FIG. 5. This pulse signal is input into the second Schmitt trigger inverter and inverted, and is input as the waveform shown at the CP input position in FIG. 5 into the CP input terminal of the D-FF IC 80. Further, the up-edge indicated by the CP input waveform arrow in FIG. 5 is input as a CP input.

The up-edge is input after the passage of a specified length of time following the resumption of the power supply and the restoration of the D-FF IC 80. Therefore, at this point the Q output changes from an H-level signal into an L-level signal. This prompts the LCD driver 73 to disable any display on the liquid crystal display unit 45. Subsequently, no matter how many times instantaneous power outages occur, because the up-edge is input as a CP input following the resumption of the power supply, the Q output signal remains at the L level. Therefore, once the display on the liquid crystal display unit 45 is disabled, no data characters are subsequently imprinted onto the photographic film 31.

When the display on the liquid crystal display unit 45 is disabled, all segments in the liquid crystal display unit 45 are turned off. This causes the natural light entering from the light collection window 15 to be blocked by the liquid crystal display unit 45, so that only the subject light entering from the shooting lens 39 is imprinted onto the photographic film 31.

After the last frame is exposed, the film counter mechanism disables the film-winding stopping mechanism from operating. Because the film-winding stopping mechanism no longer operates, the film-winding operation causes the entire exposed photographic film 31 to be spooled into the interior of the cartridge 29. The exposed film unit is sent to a developer, where the cartridge 29 that houses the exposed photographic film 31 is removed. The removed cartridge 29 is set on a film processor, on which the exposed photographic film 31 is developed.

The printer processor creates printed photographs from the exposed photographic film 31. The printed photographs and the developed photographic film are returned to the user. The finished printed photograph contains a date (for example) in the lower right portion in the case of a horizontal position photograph, and in the lower left portion in the case of a vertical position photograph. No dates are recorded on printed photographs that were taken following an instantaneous power supply interruption. The recorded date is imprinted in the same orientation as a picture taken in the horizontal orientation. The empty lens-equipped film unit is returned to the factory for recycling. During recycling, the data module 27, in which the battery 70 has been replaced, is reused.

Figure 6:
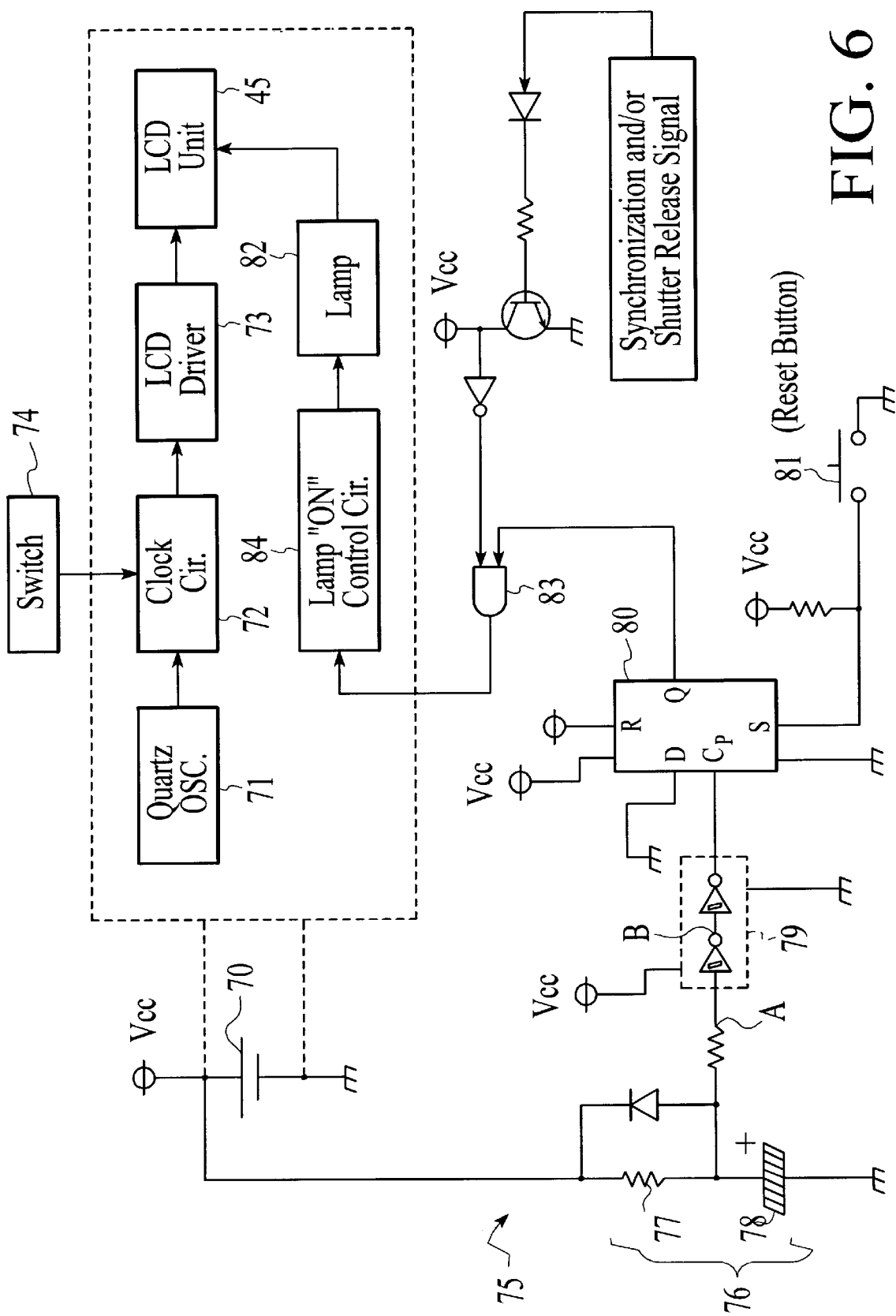
FIG. 6 is a schematic block diagram showing an alternate embodiment of the control circuit for the data module.
Figure 7:
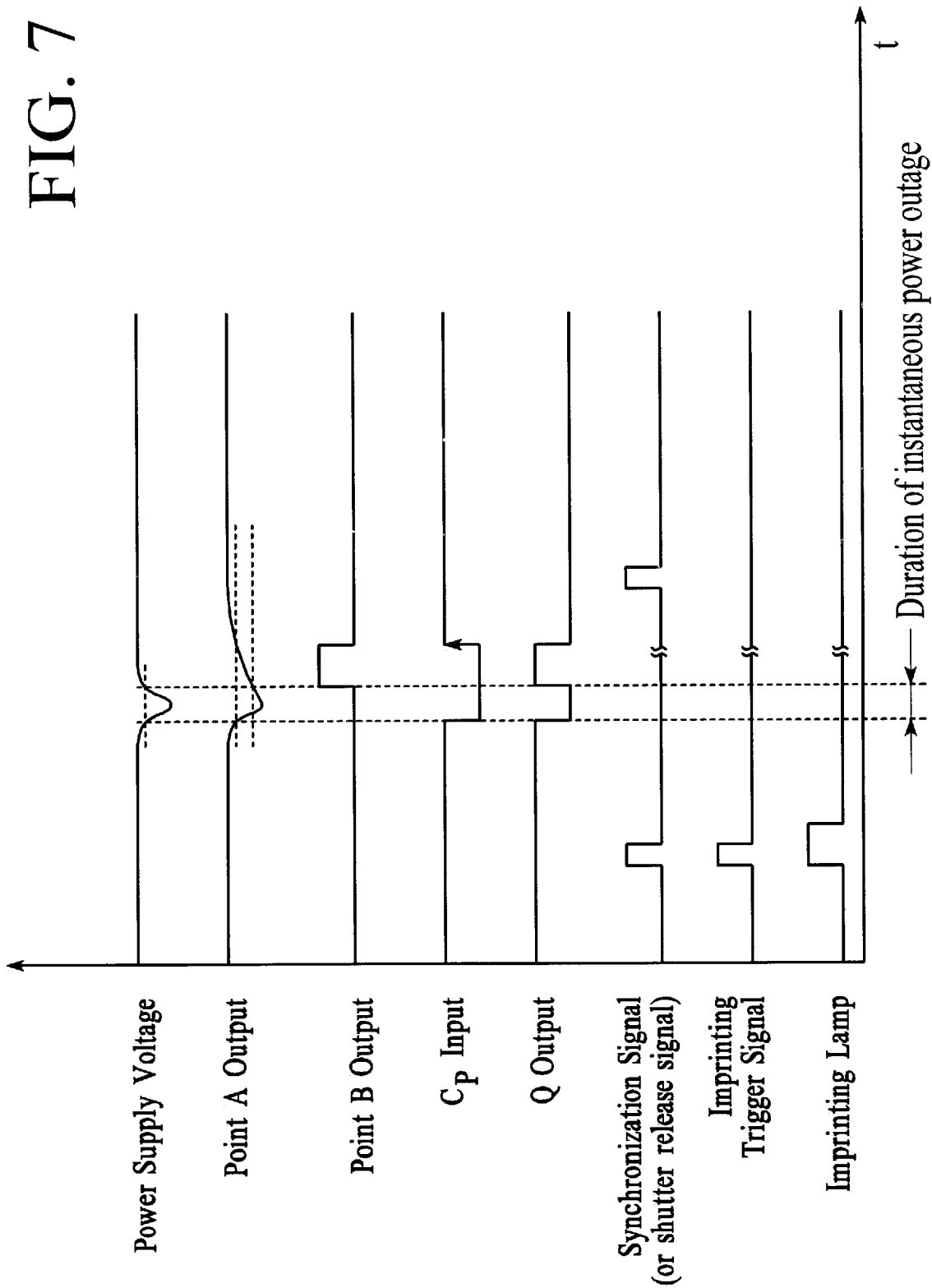
FIG. 7 is a timing chart showing the operation of the components of the control circuit of FIG. 6.

FIG. 6 is a block diagram of the data module circuit for another embodiment of the data module 27. The data module is configured so that data (e.g. the date) can be imprinted using an imprinting lamp 82 instead of natural light. FIG. 7 is a timing chart that depicts the operation of the data module. The timing at which the lamp 82 lights can be obtained by using the synchronization signal which is obtained from the synchronization switch 40 if a built-in strobe is available. Otherwise, a switch can be provided in the lower portion of the shutter button 19 and the shutter release signal produced by the switch can be employed.

The synchronization signal and/or the shutter release signal, and the signal obtained from the Q output from the D-FF IC 80 are input into the AND circuit 83, and the output from the AND circuit 83, used as an imprint trigger signal, is input into the imprinting lamp "on" control circuit 84. In the initial state, the signal obtained from the Q output is always input into the AND circuit 83 at the H level. The input of either the synchronization signal or the shutter release signal into the AND circuit 83 in concert with the shutter release action causes the AND circuit 83 to transmit an imprinting trigger signal to the imprinting lamp "on" control circuit 84. Upon receiving the trigger signal, the imprinting lamp "on" control circuit 84 lights the lamp 82.

After a temporary interruption of the power supply, the signal obtained from the Q output is input into the AND circuit 83 at the L level when the power is restored. Therefore, as shown in FIG. 7, even when either the synchronization signal or the shutter release signal is input into the AND circuit 83 in concert with the shutter release action, no imprint triggers are transmitted from the AND circuit 83. Consequently, the imprinting lamp "on" control circuit 84 will not light the imprinting lamp 82.

When the imprinting lamp 82 is used, both the light collection window 15 and the shutter material 60 may be omitted. The imprinting lamp 82 is attached to the front side of the liquid crystal display unit 45. When the lamp 82 lights, the liquid crystal display unit 45 is lit from the front side. This causes the data light, passing through the liquid crystal display unit 45, to enter into the interior of the dark box 56 through the shutter opening 59. Subsequently, the image-forming optical system forms an image from the front side on the photographic film 31.

In the above embodiments, the data light is imprinted onto the photographic film 31 from the front side. However, the present invention is by no means limited to this approach; it is equally possible to imprint the data light from the back of the photographic film 31, i.e., from the side opposite the emulsion surface. In this case, the image-forming optical system is configured so that the data light, which has passed through the liquid crystal display unit 45, is directed toward the side of the back cover 13, and an image is formed on the surface opposite to the emulsion surface of the photographic film 31. As another example, the liquid crystal display unit 45 can be provided on the back cover 13 so that the external light entering from the light collection window 15 is guided to the liquid crystal display unit by means of a light guide, for example. If the liquid crystal display unit 45 is provided on the back cover 13, from a space-saving standpoint the data light should be imprinted on a contact exposure basis.

Furthermore, as a power supply battery for the data module 27, the battery 70 may be omitted in favor of using the strobe battery 42. In this case, however, it may not be possible to supply electricity from the battery 42 to the data module 27 without changing the voltage. Should this be the case, the transformer for the strobe circuit board can be used to change the voltage to the desired level.

Figure 8:
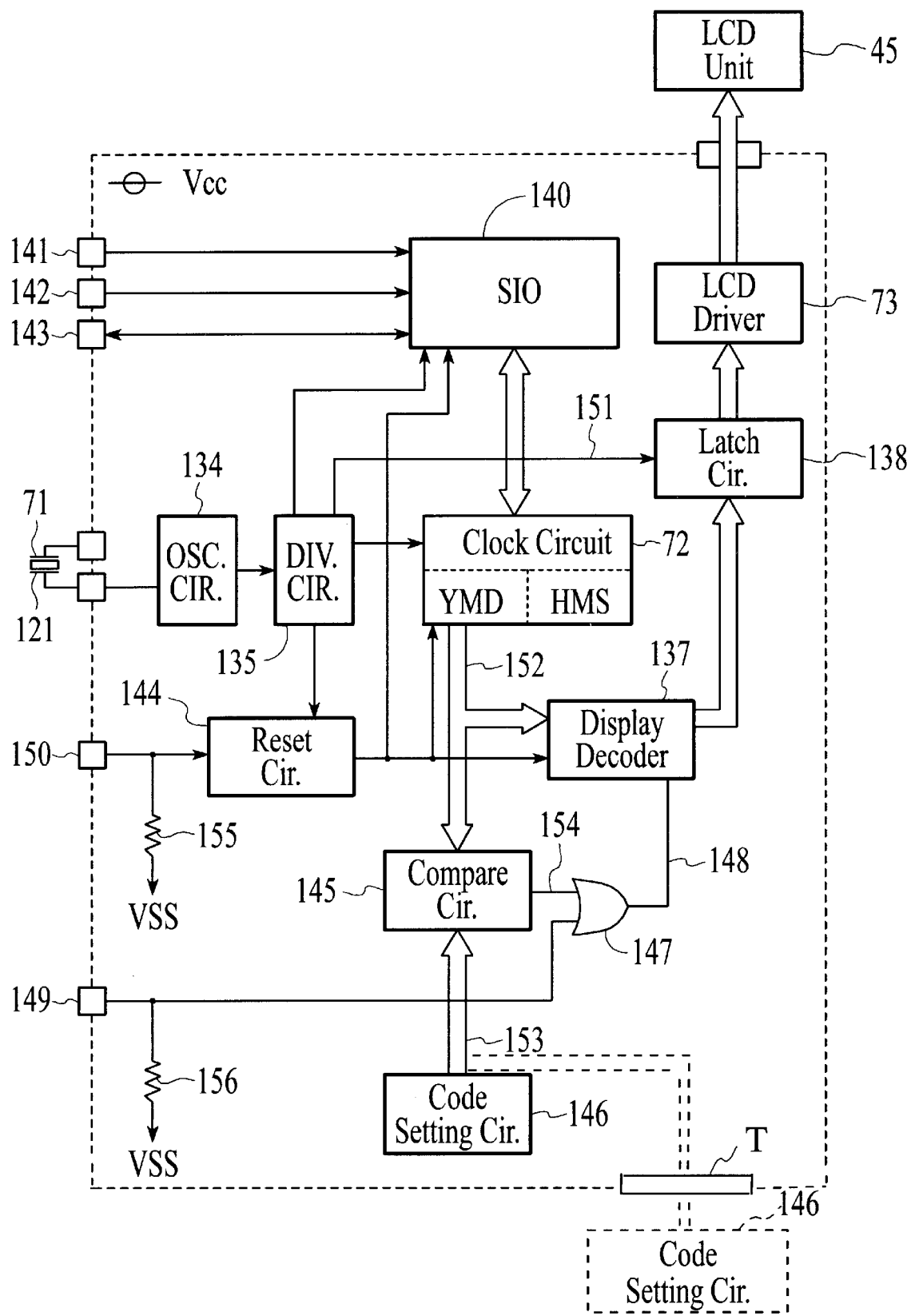
FIG. 8 is a schematic block diagram showing a further alternate embodiment of the control circuit for the data module.

FIG. 8 shows a circuit block diagram for the data module that is related to another embodiment of the data module 27. The data module 100 of this embodiment includes a circuit configuration that cancels the imprinting of data (e.g. the date) when the displayed data (e.g. date) has been initialized because of a temporary interruption of the power supply or the intrusion of external noise. The data module 100 of this embodiment includes an oscillation circuit 134, a division circuit 135, a clock circuit 72, a display decoder 137, a latch circuit 138, an LCD driver 73, a serial interface (SIO) circuit 140, a reset circuit 144, a comparison circuit 145, a code-setting circuit 146, an OR gate 147, pull-down resistors 155 and 156, and power rail lines Vcc and VSS. For the oscillation of the oscillation circuit 134, a quartz oscillator 71 is connected as an external circuit. An imprinting liquid crystal display unit 45 is connected to the output side of the LCD driver 73.

In this embodiment, the code-setting circuit 146 is the initial data retention means that holds the initial data for the clock circuit 72. The comparison circuit 145 is a comparison means that compares the initial data stored in the code-setting circuit 146 with the clock data stored in the clock circuit 72. If the comparison circuit 145 determines that the clock data is in agreement with the initial data, the output 148 from the OR 147 that comprises the data-disabling means disables the liquid crystal display unit 45 from imprinting data characters, as will be described hereinafter.

The data module 100 also contains three serial interface terminals, a CS terminal 141, an SCK terminal 142, and a DATA terminal 143, as well as a reset SR terminal 150, and a test-mode test terminal 149. These terminals, when connected to an external circuit, read and write clock data (year (Y), month (M), day (D), hour (H), minute (M), second (S)). Of the serial interface terminals, the CS terminal 141 and the SCK terminal 142 are terminals into which signals are input from the external circuit. The remaining terminal, the data terminal 143, becomes active during data communications. When this terminal is active, clock data is read and written through the DATA terminal 143 in synchronization with the external clocks that are input into the SCK terminal 142.

The data that is written from the outside into the SIO circuit 140 is transmitted to the clock circuit 72. The clock circuit 72 continues to keep time in synchronization with the count-up clocks sent from the division circuit 135. The year/month/day data 152 received from the clock circuit 72 is decoded by the display decoder 137 and is displayed on the imprinting liquid crystal display unit 45 through the latch circuit 138 and the LCD driver 73.

The display decoder 137 is controlled by the display enable signal 148. When the display enable signal 148 is at the H level, the decoder outputs the data as is; when the display enable signal is at the L level, the decoder outputs blank data. The latch circuit 138 fetches the display data from the display decoder 137 upon receiving the latch signal 151. Because in this embodiment dates are displayed to the day, it suffices to fetch display data only once a day.

Figure 9:
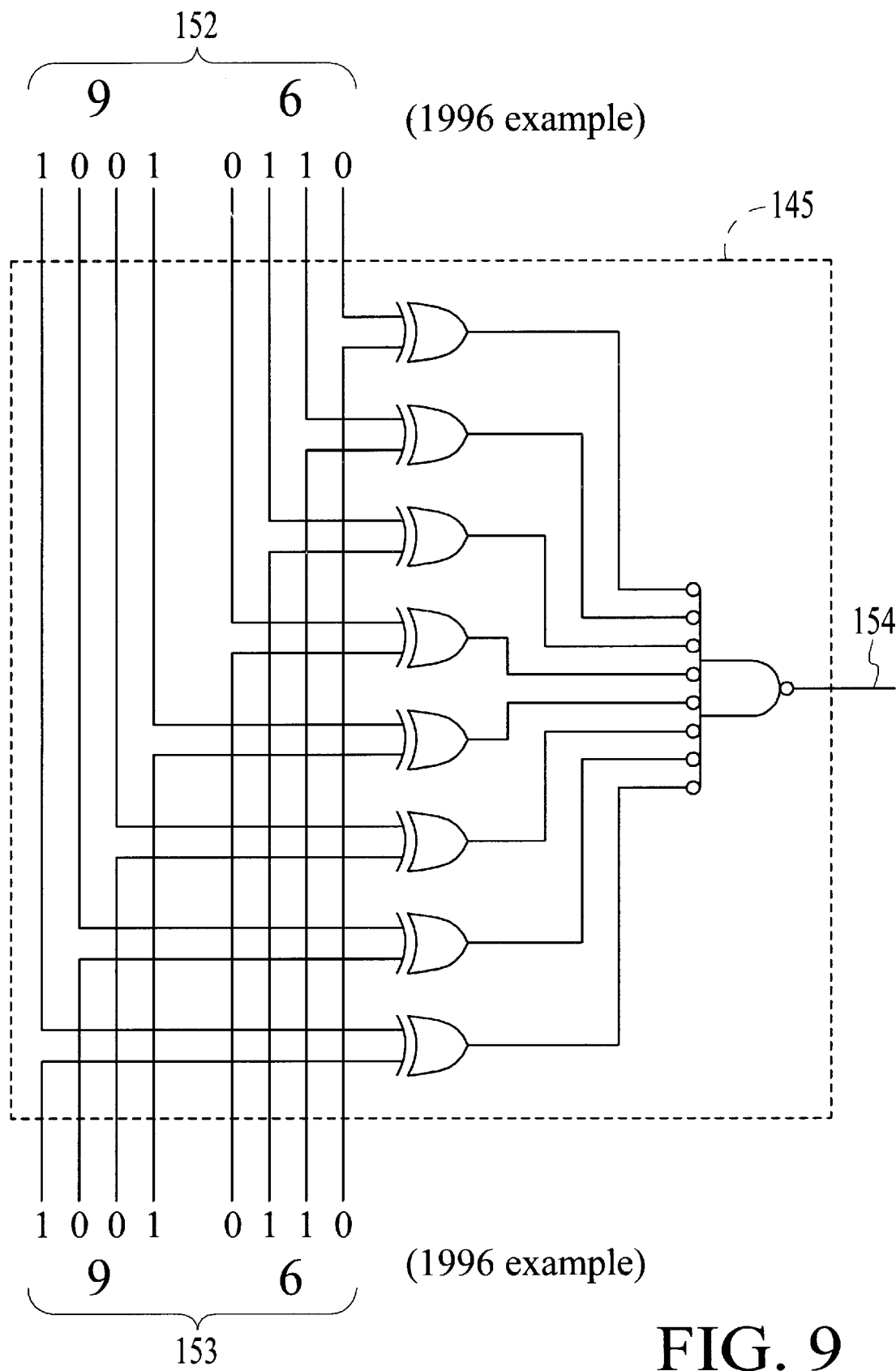
FIG. 9 is a circuit diagram of the comparison circuit of FIG. 8.

FIG. 9 shows a circuit configuration example of the above-mentioned comparison circuit 145. As shown in FIG. 9, the comparison circuit 145 of this embodiment includes 8 two-input EXOR gates and 1 eight-input OR gate. The comparison circuit is designed to compare only the year data in the year/month/day data 152 from the clock circuit 72 with the set data (initial data) 153.

If the date module 100 is reset, the data stored in the internal clock circuit 72 is initialized. Normally the initialization process is designed to reset the date to "January 1, 19XX, 00:00:00", where normally "XX" stands for the oldest year in which the date module 100 is likely to be used. However, in this embodiment, the initial value is set to "1996", assuming that the data module will be used in or after 1997. Correspondingly, the contents of the set data 153 that is preset in the code-setting circuit 146 is also set to "1996".

The following is a description of the operation that occurs when the data module 100 of this embodiment is reset by factors such as an external noise. When the module is reset, the clock contents of the clock circuit 72 are initialized, and the year data reverts to "1996". Because the preset data is "1996", the clock contents of the clock circuit 72 match the preset data 153 that is set in the code-setting circuit 146. As a result, the output 154 that represents the comparison result of the comparison circuit 145 falls to the L level.

During normal operation, the test terminal 149, which is pulled down to Vss by the pull-down resistor 156, is at the L level. Therefore, the display enable signal 148, which is an output from the OR gate 147, falls to the L level. This disables the display decoder 137 from displaying information, and blanks out the display output. As a result, nothing is displayed on the imprinting liquid crystal display unit 45. This prevents the imprinting of incorrect data onto the photographic film. In this embodiment, if no clock data is written after the data module is reset, the imprinting process remains disabled for one year, i.e. in this example until the clock circuit 72 counts up to 1997.

Although the code-setting circuit 146 is provided as an internal circuit in this embodiment, as is shown in phantom lines in FIG. 8, it is also possible to provide the code-setting circuit 146 externally accessible via terminal T so that code-setting can be performed on the circuit board. Further, although in this embodiment comparisons are performed only on the year "1996" data, the values and ranges of comparison data can be varied in order to modify the time period in which the imprinting process remains disabled.

For testing, the test terminal 149 can be raised to the H level so that, regardless of the comparison results from the comparison circuit 145, the display enable signal can be raised to the H level in order to drive and display the imprinting liquid crystal display unit 45.

As described above, the data module 100 in this embodiment blanks out the date display by the imprinting liquid crystal display unit 45 if the clock contents of the clock circuit are reset to the initial value due to an external noise. Therefore, even if the shutter is open, the imprinting liquid crystal display unit does not admit the passage of data light, thus preventing the imprinting of an incorrect onto the photographic film.

It should be noted that, as in the case of the data module (FIG. 6) of the second embodiment, the configuration of the present embodiment can be applied to a data module that is equipped with an imprint-only lamp. In such a case, the output 154 that indicates the results of a comparison by the comparison circuit 145 can be used to regulate the on/off control circuit for the lamp. The configuration of the present embodiment may also be applied to the embodiment of FIG. 4.

While the data imprinted in the above-described examples is preferably the date, other time data such as hour/minute/second or other sequential data can also be imprinted.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A data imprinting apparatus for use in a photographic unit, said data imprinting apparatus comprising:

an interface port for establishing a communication link with an external circuit device;

a clocking circuit outputting the current time and coupled to received update time information through said interface port; and an image generation unit for generating data characters representative of the current time output from said clocking circuit, said data characters being selectively imprinted.

2. The data imprinting apparatus of claim 1, further including:

a power rail line for receiving power;

a power interruption detecting mechanism determining when power is interrupted to said power rail line;

an imprint disabling circuit issuing a disable signal in response to said power interruption detecting mechanism determining that power has been interrupted to said power rail line, said disable signal being effective for preventing the imprinting of said data characters.

3. The data imprinting apparatus of claim 2, wherein said imprint disabling circuit removes said disable signal in response to receiving a predetermined data sequence through said interface port.

4. The data imprinting apparatus of claim 2, further including a reset input node for receiving a reset signal, said imprint disabling circuit removing said disable signal in response to receiving said reset signal.

5. The data imprinting apparatus of claim 4, wherein said imprint disabling circuit additionally removes said disable signal after the elapse of a predetermined time period without receiving said reset signal.

6. The data imprinting apparatus of claim 5, wherein said predetermined time period is one year.

7. The data imprinting apparatus of claim 1, wherein said clocking circuit is reset to a predetermined default time setting in response to the interruption of power to said power rail line, said clocking circuit further requiring that update time information be received through said interface port in order to establish a corrected current time output.

8. The data imprinting apparatus of claim 7, wherein said clocking circuit can receive update time information only through said interface port.

9. The data imprinting apparatus of claim 2, wherein said power interruption detecting mechanism includes a compare circuit for comparing at least a portion of the current time output of said clocking circuit with a predetermined reset time value, said compare circuit issuing a power-interruption-detected signal to said imprint disabling circuit in response to said portion of the current time output matching said predetermined reset time value.

10. The data imprinting apparatus of claim 9, wherein said predetermined reset time value is stored in a code setting circuit accessible via an externally accessible terminal, such that said predetermined reset time value may be altered via said externally accessible terminal.

11. The data imprinting apparatus of claim 4, wherein said power interruption detecting mechanism includes a voltage monitoring circuit for detecting power noise.

12. The data imprinting apparatus of claim 1, further including a communication interface circuit for controlling data transfer through said interface port.

13. The data imprinting apparatus of claim 12, wherein said interface port is a serial communication port.

14. The data imprinting apparatus of claim 1, wherein said image generation unit includes an LCD driver.

15. The data imprinting apparatus of claim 14, wherein said image generation unit further includes a display decoder coupled to receive the current time output from said clocking circuit, the output of said display decoder being coupled to said LCD driver.

16. The data imprinting apparatus of claim 1, wherein said photographic unit is a lens-equipped film unit including a battery and photographic film, said data characters being imprinted on said photographic film in conjunction with a shutter release operation.

17. A data imprinting apparatus for use in a photographic unit, said data imprinting apparatus comprising:

a power rail line for receiving power;

a power interruption detecting mechanism for identifying the occurrence of a predetermined type of power interruption to said power rail line;

an interface port for establishing a communication link with an external circuit device;

a communication interface circuit coupled to said interface port and effective for controlling data transfer through said interface port;

a clocking circuit coupled to said communication interface circuit for receiving update time settings via said interface port, said clocking circuit outputting timing information on clock output leads;

an image generation unit coupled to said clock output leads and effective for generating data characters representative of said timing information output from said clocking circuit, said data characters being selectively imprinted; and an imprint disabling circuit issuing a disable signal in response to said power interruption detecting mechanism noting the occurrence of said predetermined type of power interruption to said power rail line, said disable signal being coupled to said image generation unit and effective for preventing the imprinting of said data characters.

18. The data imprinting apparatus of claim 17, wherein said predetermined type of power interruption is a voltage glitch in said power rail line.

19. The data imprinting apparatus of claim 17, wherein said imprint disabling circuit removes said disable signal in response to receiving a predetermined data sequence through said interface port.

20. The data imprinting apparatus of claim 17, further including a reset input node for receiving a reset signal, said imprint disabling circuit removing said disable signal in response to said reset signal.

21. The data imprinting apparatus of claim 20, wherein said imprint disabling circuit additionally removes said disable signal after the elapse of a predetermined time period without receiving said reset signal.

22. The data imprinting apparatus of claim 21, wherein said predetermined time period is one year.

23. The data imprinting apparatus of claim 17, wherein said clocking circuit is reset to a predetermined default time setting in response to the interruption of power to said power rail line, said clocking circuit further requiring that update time settings be received through said interface port in order to establish a corrected current time output.

24. The data imprinting apparatus of claim 17, wherein said power interruption detecting mechanism includes a comparator circuit coupled to said clock output leads for comparing at least a portion of said timing information with a predetermined reset time value, said comparator circuit issuing a power-interruption-detected signal to said imprint disabling circuit in response to said portion of said timing information matching said predetermined reset time value.

25. The data imprinting apparatus of claim 24, wherein said predetermined reset time value is stored in a code setting circuit accessible via an externally accessible terminal, such that said predetermined reset time value may be altered via said externally accessible terminal.

26. The data imprinting apparatus of claim 20, wherein said power interruption detecting mechanism includes a voltage monitoring circuit for detecting power noise.

27. The data imprinting apparatus of claim 17, wherein said clocking circuit can receive update time settings only through said interface port.

28. The data imprinting apparatus of claim 17, wherein said interface port is a serial communication port.

29. The data imprinting apparatus of claim 17, wherein said image generation unit includes an LCD driver.

30. The data imprinting apparatus of claim 29, wherein said image generation unit further includes a display decoder coupled to receive said timing information output from said clocking circuit, the output of said display decoder being coupled to said LCD driver.

31. The data imprinting apparatus of claim 17, wherein said photographic unit is a lens-equipped film unit including a battery and photographic film, said data characters being imprinted on said photographic film in conjunction with a shutter release operation.

32. A data imprinting apparatus for use in a photographic unit, said data imprinting apparatus comprising:

a power rail line for receiving power;

a power interruption detecting mechanism for identifying the occurrence of a predetermined type of power interruption to said power rail line;

an interface port for establishing a communication link with an external circuit device;

a communication interface circuit coupled to said interface port and effective for controlling data transfer through said interface port;

a clocking circuit for receiving update time settings via said interface port, said clocking circuit being capable of receiving update time settings only through said interface port, said clocking circuit outputting timing information on clock output leads;

an image generation unit coupled to said clock output leads and effective for generating data characters representative of said timing information output from said clocking circuit, said data characters being selectively imprinted;

an imprint disabling circuit issuing a disable signal in response to said power interruption detecting mechanism noting the occurrence of said predetermined type of power interruption to said power rail line, said disable signal being coupled to said image generation unit and effective for preventing the imprinting of said data characters; and a reset input node for receiving a reset signal, said imprint disabling circuit removing said disable signal in response to said reset signal.

33. The data imprinting apparatus of claim 32, wherein said predetermined type of power interruption is a voltage glitch in said power rail line.

34. The data imprinting apparatus of claim 32, wherein said imprint disabling circuit removes said disable signal in response to receiving a predetermined data sequence through said interface port.

35. The data imprinting apparatus of claim 34, wherein said clocking circuit resets itself to a predetermined default time setting in response to said predetermined type of power interruption and said predetermined data sequence is an update time setting different from said predetermined default time setting.

36. The data imprinting apparatus of claim 32, wherein said imprint disabling circuit additionally removes said disable signal after the elapse of a predetermined time period without receiving said reset signal.

37. The data imprinting apparatus of claim 36, wherein said predetermined time period is one year.

38. The data imprinting apparatus of claim 32, wherein said clocking circuit is reset to a predetermined default time setting in response to the interruption of power to said power rail line, said clocking circuit further requiring that update time setting data be received through said interface port in order to establish a corrected current time output.

39. The data imprinting apparatus of claim 32, wherein said power interruption detecting mechanism includes a comparator circuit coupled to said clock output leads for comparing at least a portion of said timing information with a predetermined reset time value, said comparator circuit issuing a power-interruption-detected signal to said imprint disabling circuit in response to said portion of said timing information matching said predetermined reset time value.

40. The data imprinting apparatus of claim 39, wherein said predetermined reset time value is stored in a code setting circuit accessible via an externally accessible terminal, such that said predetermined reset time value may be altered via said externally accessible terminal.

41. The data imprinting apparatus of claim 32, wherein said power interruption detecting mechanism includes a voltage monitoring circuit for detecting power noise.

42. The data imprinting apparatus of claim 32, wherein said interface port is a serial communication port.

43. The data imprinting apparatus of claim 32, wherein said image generation unit includes an LCD driver.

44. The data imprinting apparatus of claim 43, wherein said image generation unit further includes a display decoder coupled to receive said timing information output from said clocking circuit, the output of said display decoder being coupled to said LCD driver.

45. The data imprinting apparatus of claim 32, wherein said photographic unit is a lens-equipped film unit including a battery and photographic film, said data characters being imprinted on said photographic film in conjunction with a shutter release operation.

* * * * *